(12) United States Patent
Subramanian et al.

(10) Patent No.: US 6,193,935 B1
(45) Date of Patent: Feb. 27, 2001

(54) CATALYTIC CONVERTER

(76) Inventors: Muthan Subramanian, 1744 Sector-8, Fardabad-121006 (IN); Pradeep Patanwal, 1137, Sec-3, PushpVihar, M.B. Road, New Delhi-110017 (IN); Ravinder Kumar Malhotra, 303, A.G.C.R. Enclave, Delhi-110092 (IN); Niranjan Raghunath Raje, 22A, Pocket A, Sukholev Vihar, New Delhi 110025 (IN)

( * ) Notice: Subject to any disclaimer, the term of this patent is extended or adjusted under 35 U.S.C. 154(b) by 0 days.

(21) Appl. No.: 09/133,433

(22) Filed: Aug. 13, 1998

(51) Int. Cl.$^7$ ........................................................ F01N 3/28
(52) U.S. Cl. ........................ 422/181; 422/171; 422/176; 422/177; 422/218
(58) Field of Search ................................... 422/177, 181, 422/218, 176, 171; 60/299

(56) References Cited

U.S. PATENT DOCUMENTS 3,380,810 * 4/1968 Hamblin ................................ 422/181
4,457,895 * 7/1984 Prigent ................................. 422/181

* cited by examiner

Primary Examiner—Hien Tran

(74) Attorney, Agent, or Firm—Venable; George H. Spencer; Ashley J. Wells

(57) ABSTRACT

A catalytic converter for treating pollutants contained in exhaust gas from an internal combustion engine, includes a chamber having an inlet disposed at a first end of the chamber for introduction of the exhaust gas and an outlet disposed at a second end of the chamber opposite the first end for discharge of the exhaust gas from the chamber after treatment; a front plate provided at the inlet of the chamber and having defined therein a plurality of openings; first, inner, and second, outer, fixed cones positioned within the chamber, disposed in a spaced apart and parallel relationship to one another, and having a plurality of spaced apart holes defined therein, wherein the plurality of holes defined in the first fixed cone are disposed in a staggered relationship to the plurality of holes of the second fixed cone, and wherein the first fixed cone defines with the front plate a first zone within the chamber; a catalyst bed which is disposed in the space defined between the first and second fixed cones, through which the exhaust gas entering the chamber through the inlet flows radially there through, and which contains catalyst in use; a diffuser section provided in the second end of the chamber, through which the outlet is provided, and within which is defined a second zone; a conical member extending from the first fixed cone into the diffuser section for providing a reduced jet effect of the exhaust gas entering the chamber; and a feeding zone for the catalyst defined by closure of a wall surface of the first and second fixed cones adjacent to the inlet.

6 Claims, 1 Drawing Sheet

CATALYTIC CONVERTER

BACKGROUND OF THE INVENTION

1. Field of the Invention

This invention relates to a catalytic converter. In particular, this invention relates to a catalytic converter having a radial flow of the exhaust or emission gases through the catalytic bed.

2. Description of the Related Art

Catalytic converters connected to the exhaust or tail pipe of a vehicle are known in the art. One such converter comprises a chamber or housing having ceramic pellets disposed therein. The ceramic pellets are impregnated with noble metals such as platinum, palladium and/or rhodium. The exhaust gases have an axial flow within the catalytic bed. A disadvantage associated with such a known construction is that the converter is not compact and the space requirements are considerable. Yet another disadvantage is the constant damage or breakage of the ceramic pellets. A further disadvantage is that the pellets get exhausted. Though such pellets can be replaced, a replacement does add to the operational costs of the converter.

In order to obviate the aforesaid disadvantages, it is known to provide a catalytic converter having a honey comb structure is impregnated with noble metals selected from platinum, palladium and/or rhodium. An advantage of such a converter is that it is compact in size. However, a disadvantage associated with such a known construction is that of considerable costs. Yet another disadvantage is that it cannot be reused. Yet a further disadvantage is that of back pressures.

A catalytic converter comprising two coaxially arranged catalyst beds within a container is known in the prior art. A portion of the exhaust gases flow through each of the beds. A quick heating of the catalyst beds is achieved by surrounding the beds with the hot exhaust gases, and further to allow the hot exhaust gases discharged from the catalyst beds to flow along the outer surface of the container.

PCT publication no. WO 96/12097 discloses a method to reduce HC and CO emissions from a two stroke gasoline engine. A compound of platinum group metal is added to the cylinder of the engine which acts as an active oxidation catalyst by combustion of the fuel. The platinum group metal compound may be added to the lubricating oil or fuel.

An object of this invention is to propose an improved construction of a catalytic converter for use with the tail or exhaust pipe of a vehicle.

Another object of this invention is to propose a catalytic converter for use with the tail or exhaust pipe of a vehicle which is compact and can advantageously be employed in vehicles such as motorcycles and mopeds.

Still another object of this invention is to propose a catalytic converter for use with the tail or exhaust pipe of a vehicle and wherein the flow of the exhaust or emission gases through the catalytic bed is radial.

Yet another object of this invention is to propose a catalytic converter for use with the tail or exhaust pipe of a vehicle which provides an increased surface area of contact of the gases with the catalytic agent.

SUMMARY OF THE INVENTION

According to this invention there is provided a catalytic converter for use with the tail or emission pipe of an engine comprising:

i) a chamber having an inlet for introduction of the exhaust gases having the pollutants entrained therein, an outlet for discharge of the cleaned exhaust gases, said inlet disposed at one end of said chamber, said outlet disposed at an opposite end of said chamber, said inlet spaced from said outlet to define a first and second zone therebetween;

ii) first and second cones disposed in a spaced and parallel relationship to each other within said chamber so as to define said first and second zones;

iii) a catalytic bed disposed in the space defined between said first and second cones and such that the exhaust gases entering the chamber through said inlet flow radially through the catalytic bed;

iv) said second zone having a diffuser section, the outlet being provided in said diffuser section;

v) a conical member extending from said first cone into said diffuser section, said conical member providing a reduction in the jet effect of the emission gases entering said chamber.

The present invention relates to a radial flow conical catalytic converter for spark ignition internal combustion engines. The catalytic converter employs pellets/beads as catalyst for lowering harmful exhaust gases such as carbon monoxide, unburnt hydrocarbons and nitric oxides by method of reactions using oxidation, reduction or combining both the effects into harmless products such as carbondioxide, water vapor and nitrogen oxide. The conical design allows large contact area for catalyst while compact size enable easy fitment into the silencer of small vehicles.

One of the distinct advantages of the catalytic converter is that it has a construction which allows it to be compact and can be used in vehicles such as motorcycles and scooters, which hitherto could not have a catalytic converter due to lack of space.

BRIEF DESCRIPTION OF THE DRAWINGS

Further objects and advantages of this invention will be more apparent from the ensuing description when read in conjunction with the accompanying drawings and wherein.

DESCRIPTION OF THE PREFERRED EMBODIMENTS

Figure 1:
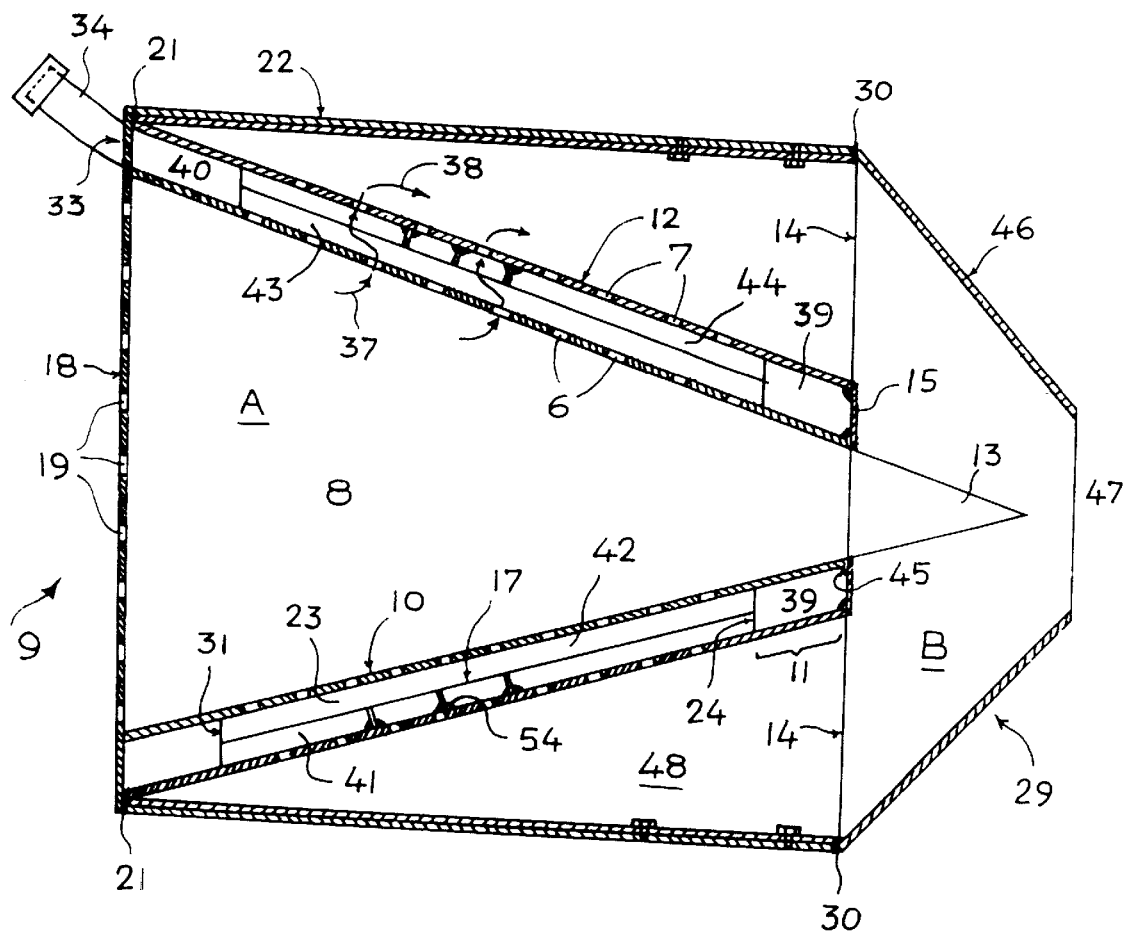
FIG. 1 shows a schematic plan view of the catalytic converter of the present invention.

Referring to FIG. 1, the catalytic converter 9 comprises a chamber 8 having a first zone A separated from a second zone B through cones 10 and 12.

Specifically, the catalytic converter 9 of the present invention comprises a first or inner cone 10 provided in first zone A of said chamber 8. The converter comprises a second cone 12 spaced from first cone 10 and such as to define a space therebetween for a catalyst bed 23. However, the active part of catalyst bed 23 does not extend along entire length of the space defined between cones 10 and 12. In fact a closure 15 closes one end of catalyst bed 23 and such as to define as inactive closed zone 39. Reference numeral 11 designates the length of inactive zone 39.

The inlet or front end of catalytic converter 9 has an inlet wall 18 with a plurality of spaced openings 19. Emission or exhaust gases enter chamber 8 through openings 19.

As shown in FIG. 1, the inner or first cone 10 extends into second zone B and such as to define a zone 13. The wall surface of cone 10 in zone 13 is a closed surface so as to prevent any flow of exhaust gases into zone B. Zone 13 reduces the jet effect of the gases. Several distinct advantages are associated with the presence of firstly zone 13 and secondly in the location of having zone 13 within zone B. One such advantage is that zone 13 does not disturb the flow pattern of the exhaust gases through bed 23. When the gases enter zone A, such gases have approximately a temperature of 250°, but which increases to a temperature of approximately 1000° C. upon contacting the catalyst bed. Due to such severe conditions of an increase in temperature and for an effective removal of the pollutants entrained in the exhaust gases, the flow of the gases through the catalytic bed should preferably be uniform, and which is facilitated by zone 13 and closed zone 39. Yet another advantage provided by zone 13 is that of only negligible changes in the flow pattern of the gases. Any substantial changes in the flow pattern can affect the stability and performance of the catalyst bed, and particularly if there be a non uniform distribution of gases. Further, as the walls of zone 13 are inclined and converging, the force acting on the walls by the gas stream acting thereon is reduced in comparison to a straight wall. Yet another factor in consideration is that of back pressure. As zone 13 is located away from front plate 18, a back pressure does not act on the engine.

First cone 10 and second cone 12 have each a plurality of spaced openings 6 and 7 respectively. However, openings 6 and 7 are provided in a staggered relationship to each other. Further, the pitch of the openings 6 is different to that of openings 7. Thus, exhaust gases enter bed 23 as shown by arrow head 37 and are discharged through openings 7 in a manner as shown by arrow 38. Such a manner of providing holes 6 and 7 increases the contact period of the gases within catalyst bed 23. Cones 10 and 12 simultaneously allow a radial flow of said gases.

Front plate or inlet wall or front wall 18 has an opening 33 connected to a feed inlet pipe 34 for introduction of the catalyst into bed 23.

Side wall 22 of catalytic converter 9 is welded to front wall 18 by means of weld joints 21. Similarly, strip 17 is welded to second cone 12 through weld joints 54. Strip 17 is held at the front end to a front support 24 and to a back support 31. Strip 17 defines compartments 41 42, 43 44 within bed 23. Back support 31 defines a feeding zone 40 for the catalyst.

Inner cone 10 and outer cone 12 are welded to a strip 14 at weld joints 45.

Zone B is defined in a diffuser 29 having inclined walls 46 converging to an outlet 47. Diffuser 29 is an integral member of the converter and has a diameter at the inlet end corresponding to that of chamber 8. Diffuser 29 is welded to walls 22 through weld joint 30.

A first expansion of the gases takes place in chamber 48 and as the gases expand a reduction in the temperature occurs of the gas. A second expansion takes place at discharge in diffuser 29 and outlet 47.

What is claimed is:

1. A catalytic converter for treating pollutants contained in exhaust gas from an internal combustion engine, comprising:
   a. a chamber having an inlet disposed at a first end of the chamber for introduction of the exhaust gas and an outlet disposed at a second end of the chamber opposite the first end for discharge of the exhaust gas from the chamber after treatment;
   b. a front plate provided at the inlet of the chamber and having defined therein a plurality of openings;
   c. first, inner, and second, outer, fixed cones positioned within the chamber, disposed in a spaced apart and parallel relationship to one other, and having a plurality of spaced apart holes defined therein, wherein the plurality of holes defines in the first, inner, fixed cone are disposed in a staggered relationship to the plurality of holes of the second, outer, fixed cone, and wherein the first, inner, fixed cone defines with the front plate a first zone within the chamber;
   d. a catalyst bed which is disposed in the space defined between the first, inner, and second, outer, fixed cones, through which the exhaust gas entering the chamber through the inlet flows radially there through, and which contains catalyst in use;
   e. a diffuser section provided in the second end of the chamber, through which the outlet is provided, and within which is defined a second zone;
   f. a conical member extending from the first, inner, fixed cone into the diffuser section for providing a reduced jet effect of the exhaust gas entering the chamber; and
   g. a feeding zone for the catalyst defined by closure of a wall surface of the first, inner, and second, outer, fixed cones adjacent to the inlet.

2. The catalytic converter as claimed in claim 1, wherein the plurality of holes defined in the first, inner, fixed cone have a pitch which is different from that of the plurality of holes defined in the second, outer, fixed cone.

3. The catalytic converter as claimed in claim 1, wherein the first, inner, and second, outer, fixed cones each have a length, and wherein the respective plurality of holes are provided along only a part of the length of the first, inner, and second, outer, fixed cones so as to contain an active catalyst bed therein.

4. The catalytic converter as claimed in claim 1, wherein the conical member is spaced away from the outlet of the chamber.

5. The catalytic converter as claimed in claim 1, wherein the diffuser section has outer walls which converge toward the outlet.

6. The catalytic converter as claimed in claim 1, wherein the catalyst bed has strips to define a plurality of compartments within which the catalyst is contained.

* * * * *